Jan. 9, 1940.   H. M. ULLSTRAND   2,186,128
LIQUID FUEL BURNER
Filed Dec. 28, 1936
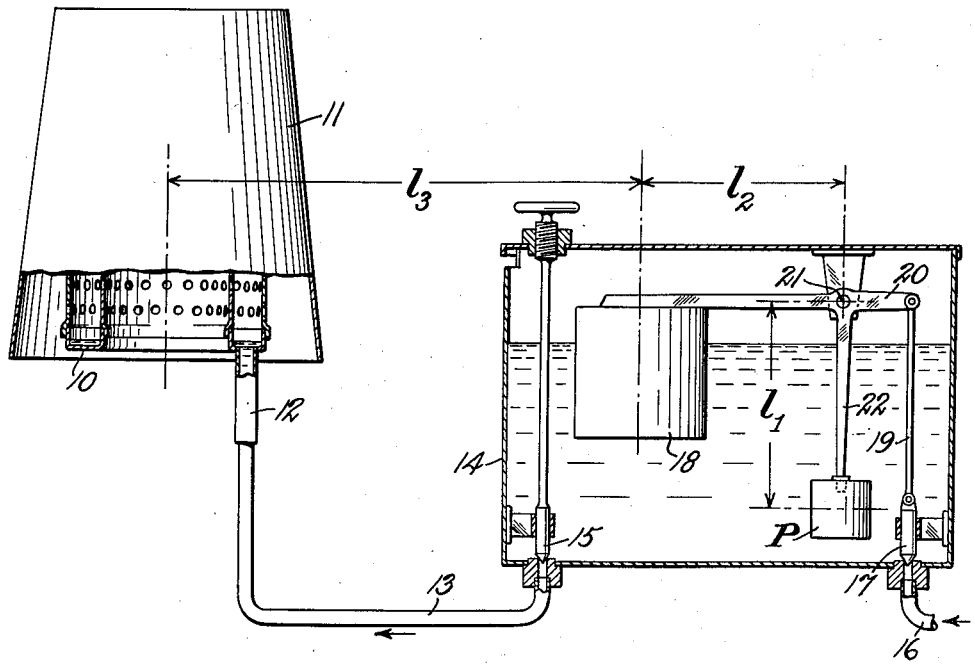
INVENTOR,
Hugo M. Ullstrand
BY O. E. Huth
his ATTORNEY.

Patented Jan. 9, 1940

2,186,128

UNITED STATES PATENT OFFICE 2,186,128

LIQUID FUEL BURNER

Hugo M. Ullstrand, Evansville, Ind., assignor to Servel, Inc., New York, N. Y., a corporation of Delaware Application December 28, 1936, Serial No. 117,775

2 Claims. (Cl. 158—38)

My invention relates to liquid fuel burners and more particularly to a burner controlled by a float operated valve.

It is an object of my invention to provide a simple arrangement for automatically compensating tilting of a float valve controlled burner as will appear from the following description and accompanying drawing in which the single figure shows schematically a float valve controlled kerosene burner embodying the invention.

Referring to the drawing, an annular burner well 10 is provided with a suitable chimney 11. The upper end of a burner tube 12 is connected to the burner well 10. The lower end of the burner tube 12 is connected by a conduit 13 to a float chamber or control chamber formed by a casing 14. Communication between the float vessel 14 and conduit 13 is controlled by an adjustable needle valve 15 which regulates the flow of liquid from the float vessel to the burner well. Liquid fuel is supplied to the float vessel 14 through a conduit 16. Flow of liquid fuel from conduit 16 into the float vessel 14 is controlled by a valve 17 operated by a float 18 responsive to level of liquid in the float vessel 14. The valve 17 is operatively connected by a rod 19 to one end of a float lever 20. The float 18 is operatively connected to the other end of the float lever 20. The float lever is pivoted at 21.

The float 18 operates the valve 17 in a well known manner to maintain a substantially constant level of liquid fuel in the float vessel 14. With a constant head of liquid fuel in the vessel 14, the needle valve 15 may be adjusted to maintain a desired level of liquid fuel in the burner tube 12 and vaporizing well 10. When the burner is not in operation, liquid will stand in the burner well at the same level as in the float vessel 14. Tilting of this burner assembly causes variation in liquid level in the burner well 10 which interferes with proper operation of the burner.

In accordance with my invention I provide for automatic compensation for tilting of the burner by rigidly attaching to the float lever 20 directly below the pivot point 21 a pendulum comprising a rod 22 and a weight P. The weight P is attached to the lower end of the rod 22 and the upper end of the rod 22 is rigidly connected to the lever 20 directly beneath the pivot point 21. The dimension $l_1$ is the distance from the pivot point 21 to the center of gravity of the weight P. The weight P is the weight of the pendulum in liquid or in air depending upon whether the pendulum is suspended in liquid as shown or in air if the leverage is above the liquid level. As known, the weight in liquid is less than the weight in air. The weight P may include the weight of the arm 22 (compound pendulum) or the latter, if relatively very small, may be neglected (simple pendulum). This only affects the dimension $l_1$ from the pivot point 21 to the center of gravity of the pendulum. The dimension $l_2$ is the distance from the pivot point 21 to the center of the float 18. The dimension $l_3$ is the distance from the center of the annular burner well 10 to the center of the float 18.

If the weight P and the arm $l_1$ are correctly proportioned in relation to the other dimensions, a change in liquid level in the float vessel 14 will correspond to tilting in such a way that the liquid level in the burner well 10 will remain constant. This is because when the burner assembly is in a horizontal position, the weight P is located vertically below the pivot point 21 and is neutral. However, if the burner is tilted, the weight P creates a torque having the same effect as adding or removing a weight to the float whereby the liquid level is changed correspondingly. This arrangement provides an ideal compensation for any angle of tilting within reasonable limits. Assume that the burner assembly shown in the figure is tilted $v$ degrees to the right. In order for the level of liquid to remain constant in the burner well 10, the level at the float has to rise $$l_3 \sin v$$

We will designate the specific gravity of the liquid fuel by the letter $s$ and the mean horizontal area of the float 18 by the letter $f$. Then $$Pl_1 \sin v = sfl_3 \sin v l_2$$

or $$Pl_1 = sfl_3 l_2$$

Knowing the structural dimensions $l_2$ and $l_3$, the float area $f$, and the specific gravity $s$ of the liquid fuel, the product $Pl_1$ may be determined from the above equation and the pendulum comprising rod 22 and weight P constructed accordingly.

With tilting of the burner assembly angular movement of the pendulum is effected to compensate for change in liquid level, as pointed out above. The lever 22 and weight P constituting the pendulum are arranged to displace liquid with flow of liquid in the system, as shown in the drawing, whereby the liquid exerts a damping effect to movement of the pendulum. With this arrangement undesirable swaying of the pendulum is avoided, and the desired compensation for change in liquid level is accurately effected with tilting of the burner assembly.

What is claimed is:

1. A liquid fuel burner including a burner well, a float chamber, a conduit for liquid fuel from said float chamber to said burner well, a supply of liquid fuel having a specific gravity $s$, a conduit for liquid fuel from said supply to said float chamber, a valve for controlling admission of liquid fuel to said chamber, a float of area $f$ in said float chamber, the center of said float being a horizontal distance $l_3$ from the center of said burner well, a lever having one end connected to said float and the other end connected to said valve and pivoted intermediate its ends at a point a horizontal distance $l_2$ from the center of said float, and a pendulum rigidly attached to said lever, the product of the weight of said pendulum and the distance from its center of gravity to said pivot point being equal to the product of $s$, $f$, $l_3$, and $l_2$.

2. In a liquid flow system including a control device located at a first place and from which liquid flows to a second place in the system, said device including a chamber having an inlet and a float therein, a valve for controlling admission of liquid into the chamber at the inlet, a lever, means to pivot said lever intermediate its ends at a fixed point with respect to the inlet, said float and said valve being operatively connected to said lever on opposite sides of the pivot point, and a pendulum rigidly attached to said lever and always movable with the latter, said pendulum being located so that the lower end thereof displaces liquid in the chamber with flow of liquid in the system, the liquid in the chamber having a damping effect to movement of said pendulum, and said pendulum being constructed and arranged to exert a torque on said lever when the system is tilted to affect operation of said valve by said float to maintain a desired level of liquid in the second place, regardless of tilting of the system.

HUGO M. ULLSTRAND.